Sept. 2, 1958 N. C. McCALLUM 2,850,337
BEARINGS

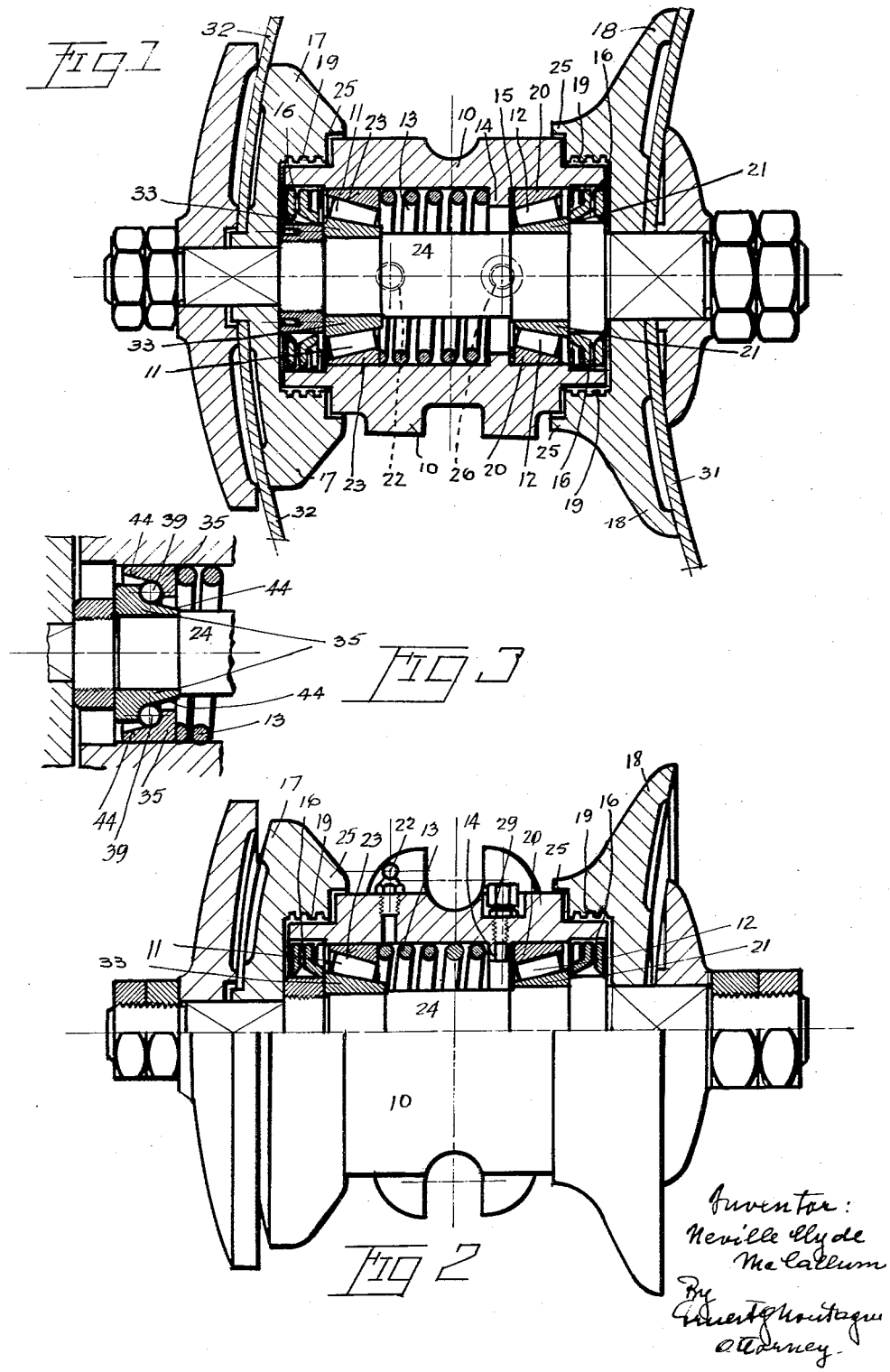

Filed March 25, 1955 2 Sheets-Sheet 2

Inventor:
Neville Clyde McCallum
By Ernest Montague
Attorney

United States Patent Office 2,850,337
Patented Sept. 2, 1958

2,850,337

BEARINGS

Neville Clyde McCallum, Perth, Western Australia, Australia

Application March 25, 1955, Serial No. 496,883

Claims priority, application Australia May 31, 1954

10 Claims. (Cl. 308—189)

This invention has reference to improvements in and relating to bearings, particularly that type generally termed encased fluid pressure bearings.

This type of bearing is commonly used on agricultural machinery, such as for the mounting of the discs on disc ploughs, and is consequently subjected to high endwise, i. e. longitudinal, shock factors. Hitherto, bearings which have been used for this purpose have a short life before being fractured as a result of these forces.

It is an object of the present invention to overcome such disadvantage and increase the life of this type of bearing by producing such improvements in this class of bearing, which will perform efficiently and effectively, and which will also be adapted to be readily manufactured, and easily assembled.

Furthermore, this type of bearing, for efficient lubrication particularly when using grease, should be filled with lubricant. At present however, when they become warm, the said bearings suffer from the disadvantage, through the lubricant expanding, of the bursting of the seals, and at times, even the bearing itself. A further object therefore, is to produce a bearing which is not subject to this disadvantage.

By the herein invention, I set forth one form of a bearing and associated members, and its application to the invention in general, such bearing for example being usable in conjunction with agricultural implements. It will of course be understood however, that the invention is not limited to such types of machines, but may be used and applied to machinery in general.

With this and other objects in view which will become apparent in the following detailed description, the present invention will be clearly understood in connection with the accompanying drawings, in which:

Figure 1 is a sectional elevation of the bearing;

Fig. 2 is a plan view, partly in section of the bearing showing in Fig. 1;

Fig. 3 is a fragmentary sectional elevation, showing the association of a ball race;

Figure 4:
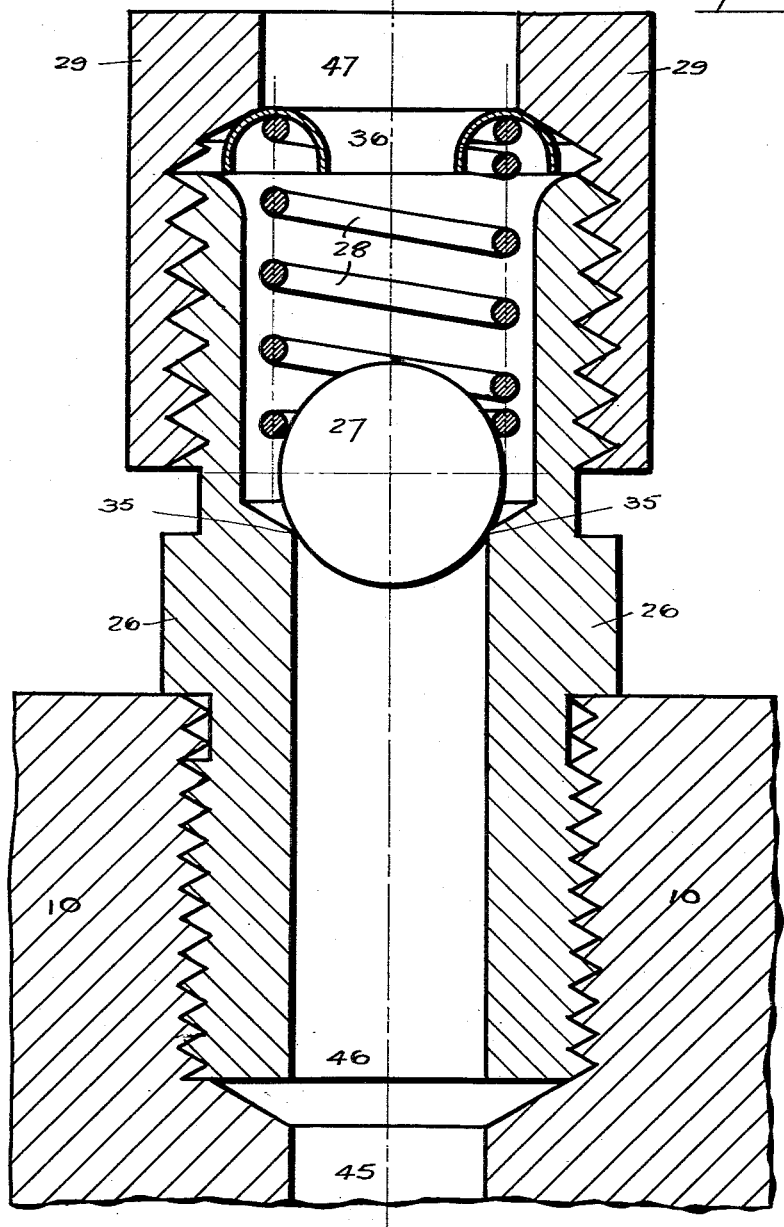
Fig. 4 is a sectional elevation, on an enlarged scale of a variable pressure relief valve.

Referring to the said drawings:

Within the main body or casing 10 of the bearing, is housed companion roller bearing or races 11—12. One of these as 11 is subjected to pressure from a spiral spring 13, whilst its companion as 12 is held captive by a suitable collar or shoulder as 14. One purpose of this spring is to render the whole bearing self-adjusting, but in this type of bearing, particularly when used in agricultural implements, such as stump-jump disc ploughs, or any other machine in which high shock factors are experienced, this spring 13, has a vital major purpose, as follows:

A major disadvantage of the hitherto type of bearing is that when the plough discs 31 or 32 strike an obstacle or obstruction, and the jump arm is actuated, the disc rises to clear the said obstruction, and is then abruptly forced back into the earth by the power of the compressed jump-arm spring and the weight of the mechanism.

If the disc, on being abruptly forced into the earth in this manner, should strike a solid object, such as a rock, then invariably the hardened brittle cups or cones, fracture under the impact. This disadvantage has been overcome in the herein bearing, by installing the spiral spring 13 as aforesaid, and fitting for example, a lead-bronze washer 15 between the captive bearing cup 20 and the retaining collar or shoulder 14. The result is that the lead-bronze washer sufficiently dampens the shock and prevents the fracture of the captive cup 20 or cone 21.

When a hitherto bearing fitted with dual captive bearing races is used on a twin disc plough, should the leading disc as 31 strike an obstruction, and subsequently be released therefrom as abovementioned the rear cup 23 or cone 33 invariably fractures owing to the excessive jarring vertical leverage action incurred. This major disadvantage has been completely eliminated by installing the spiral spring as 13 in the bearing as set out herein, which prevents the cup or cone from fracturing, by allowing the spring loaded bearing cup 23 to move forward, when the vertical pressure exceeds a predetermined critical figure. This buffer action effectively prevents the cup or cone from fracturing.

Should the rear disc 32 strike an obstruction and subsequently be released therefrom as aforementioned, then the initial vertical shock is absorbed by the spring loaded cup 23, moving forward when the aforesaid vertical pressure exceeds a predetermined figure. Similarly, the jarring vertical leverage force operating in the opposite direction on the captive bearing cup 20 causes the leading cone 21 and roller 12, to move forward thereby compressing the spiral spring 13, which acts as a buffer, and thereby prevents the fracture of the captive bearing cup 20, or the loading cone 21.

It will be understood, of course that the main shaft 24, must move a fraction to the right, to enable the captive roller 12 held by the cone 21 to move forward on the captive cup 20. It is therefore, imperative that the spiral spring 13 be compressed and exerts an horizontal force powerful enough to enable the bearing races to operate efficiently and safely, but capable of being further compressed when vertical forces on the bearing cups exceed a predetermined figure. It has been found that a load of eighty-four pounds (84) compression on the spiral spring is the correct loading.

The arrangement shown in the drawings for absorbing radial shocks may be modified and yet still produce the same function. For instance, the tapered roller bearing 11 may be replaced by a convention dual captive roller or ball race since the conversion of radial shocks to axial displacement of the shaft is mainly achieved through the action of the tapered roller bearing 12.

As shown in Fig. 3 companion ball races as 35, having therein balls as 39 may be employed in lieu of the rollers as aforesaid. One of these races as 35—39 is subjected to pressure from the spring 13, whilst its companion is held captive by the aforesaid collar or shoulder 14.

The races and therein balls, held captive by the shoulder 14 is not shown in this figure.

Each of these ball races is made with an angular contact lead-off as 44, for purposes hereinafter described.

The operation and action of these ball races, as applied to the herein bearing, is similar to that described as aforesaid in relation to the roller bearings but in addition the following applies to the said ball races.

When the vertical stress on the disc 32, exceeds a predetermined critical figure, the outer race 35—39 moves forward thereby compressing the spiral spring 13, which acts as a buffer, thereby preventing the hardened brittle races from fracturing, relief also being given to the balls 39 by virtue of the angular load off 44, latter giving the balls the scope and tendence for what may be termed a "rolling relief."

Similarly, the vertical stress on the disc 31, exceeding a predetermined critical figure, causes the inner race to move inwardly, compressing the spiral spring 13, which absorbs the shock, thereby preventing fracture of the ball race held captive by the aforesaid collar 14, relief being likewise imparted thereto by the "rolling relief" of the balls down the angular contact lead off as aforesaid.

In this case also, the main shaft 24 must move longitudinally a fraction to assist the spiral spring 13 to compress, therefore, a safety shoulder 41 is incorporated within the casing 10 which prevents damage to the bearing as a whole, and also provides a safety factor in the event of breakage of the said spiral spring 13.

It has been found during experimental practice that a correct loading on the spiral spring in this instance is 120 pounds, but of course such loading is not arbitrary, and may be varied to suit varying conditions.

Further, I have found that an excellent working angle for the load-off contact 44 for the respective races is twelve and a half degrees (12½°) but it is to be understood that I do not desire to limit myself to such angle, as various types of machines working under differing conditions will need to vary such angular contact lead-off.

Within the body of the main casing 10, and at each end thereof is also housed suitable sealing washers 16, either of a flat, cupped or other approved formation as desired, but it is essential that a high performance double-sided leather and/or rubber or other approved compound seal be installed, ensuring the retention of grease under pressure, and the total exclusion of air and foreign matter.

The end plates 17 and 18 of the bearing housing are made with sand shrouds 25 and grease grooves 19, and before being fitted into operative position, are packed with heavy anti-friction grease to seal same against entry of sand and other foreign matter, to the body of the casing.

The said main casing 10 of the bearing is also provided with a grease nipple 22 for the convenience of allowing a periodic re-filling with lubricant, and/or when the pressure within the body of the casing falls below a predetermined pressure for that necessary for efficient operation.

The variable pressure valve may for example comprise a body 26 and a ball or other appropriately shaped unit 27, closeable against its seat 35, under the influence of a spring 28. The extent of spring pressure maintaining the ball or unit 27 on its seat is capable of being regulated by means of a screw-threaded cap 29, the said spring being held captive by cup washer 36.

When the bearing is charged and filled with grease or oil, any further supply at an enhanced pressure beyond that which has been predetermined, results in the valve opening, and the excess lubricant escaping through the passages 30—46 of the casing and valve respectively, raising the ball or unit as 27 against the spring 28, and issuing through the outlet 47.

When such bearing is used in the normal way, the expansion of the lubricant, through heating or otherwise, increases the pressure within the bearing casing, and thus opens the valve and allows the escape of a sufficient amount of lubricant, to restore the normal predetermined pressure therein. In consequence, the seals do not break under pressure, and there is no possibility of a bursting of the bearing.

This variable pressure valve also functions as a dust excluder.

The adjustment of this valve is of vital importance in that, if the internal pressure within the bearing casing is raised too high by increasing the spring pressure on the valve ball then the temperature of the lubricant therein will rise, the excessive oil separation may occur. However, experiments have proved that, in a moderate climate, an internal operating pressure of 5 to 8 pounds per square inch is the most efficient operating pressure; consequently the temperature of the lubricant does not rise beyond a predetermined figure, oxidation and channelling is prevented, and the hitherto resultant frictional drag in the bearing is entirely eliminated.

When this invention is used under sub-zero or cold conditions, it may be found desirable to increase the spring pressure of the said variable pressure valve.

I have found that unsurpassing efficiency is attained if a lithium based light grease is used in this invention.

While I have disclosed several embodiments of the present invention, it is to be understood that these embodiments are given by example only and not in a limiting sense, the scope of the present invention being determined by the objects and the claims.

I claim:

1. In combination, a bearing housing, a shaft extending axially through said housing, a first anti-friction element fixed to said shaft and disposed within said housing, said housing forming an abutment surface therewithin, resilient means disposed in said housing and engaging said abutment surface and said first anti-friction element, respectively, to cushion axial displacement of said first anti-friction element, and a second anti-friction element having sections relatively displaceable axially when subjected to radial shocks disposed in the housing with one of said displaceable sections fixed to said shaft, whereby said shaft is axially displaced against the tension of said resilient means when said shaft is subjected to a radial shock.

2. The combination, as set forth in claim 1, wherein said abutment surface is formed as an annular shoulder projecting substantially radially inwardly from the inner face of said housing and which includes a shock absorbing washer disposed between said annular shoulder and said second anti-friction element.

3. The combination, as set forth in claim 2, in which said shock absorbing washer is of a lead-bronze composition.

4. In combination, a bearing housing, a shaft extending axially through said housing, an annular shoulder projecting substantially radially inwardly from the inner face of said housing, a first anti-friction element fixed to said shaft and disposed within said housing, resilient means disposed in said housing and engaging said annular shoulder and said first anti-friction element, respectively, to cushion axial displacement of said first anti-friction element, a second anti-friction element having sections relatively displaceable axially when subjected to radial shocks disposed in said housing with one of its displaceable sections fixed to said shaft whereby said shaft is axially displaced against the tension of said resilient means when said shaft is subjected to a radial shock, said housing having a passage communicating with the interior thereof, and a variable pressure relief valve at the outer end of said passage in order to maintain a predetermined pressure in said housing.

5. The combination, as set forth in claim 1, wherein said second anti-friction element is a tapered roller bearing.

6. The combination, as set forth in claim 1, wherein said second anti-friction element is a ball bearing having balls interposed between opposing races and said races have an angular contrast lead-off, to impart rolling relief movement to said balls when subjected to stress.

7. In combination, a bearing housing, a shaft extending axially through said housing, an annular shoulder projecting substantially radially inwardly from the inner face of said housing, a pair of anti-friction elements having sections relatively displaceable axially in response to radial shocks disposed within said housing with one section of each of said elements fixed to said shaft, a helical spring disposed in said housing and engaging said annular shoulder and one of said anti-friction elements, respectively, to cushion axial displacement of said one anti-friction element.

8. The combination, as set forth in claim 7, wherein said housing comprises a main body having end faces, and end plates engaging and complementary to said end faces of said main body.

9. The combination, as set forth in claim 8, wherein said end plates have axially extending projections overlapping the outer face of said housing to operate as sand shrouds.

10. The combination, as set forth in claim 8, wherein said end plates have axially extending inner cylindrical faces engaging complementary faces of said housing and having peripheral grease grooves.

References Cited in the file of this patent

UNITED STATES PATENTS

| | | |
|---|---|---|
| 1,305,964 | Dickson | June 3, 1919 |
| 2,324,065 | Coffing | July 13, 1943 |
| 2,329,087 | Russell | Sept. 7, 1943 |
| 2,492,672 | Wood | Dec. 27, 1949 |
| 2,548,644 | Wightman | Apr. 10, 1951 |
| 2,580,508 | Birdwell | Jan. 1, 1952 |
| 2,610,097 | Shelden et al. | Sept. 9, 1952 |
| 2,611,450 | Kalikow | Sept. 23, 1952 |